April 19, 1932.  F. MADDEN  1,854,554
CORN HARVESTER
Filed May 24, 1929  7 Sheets-Sheet 1
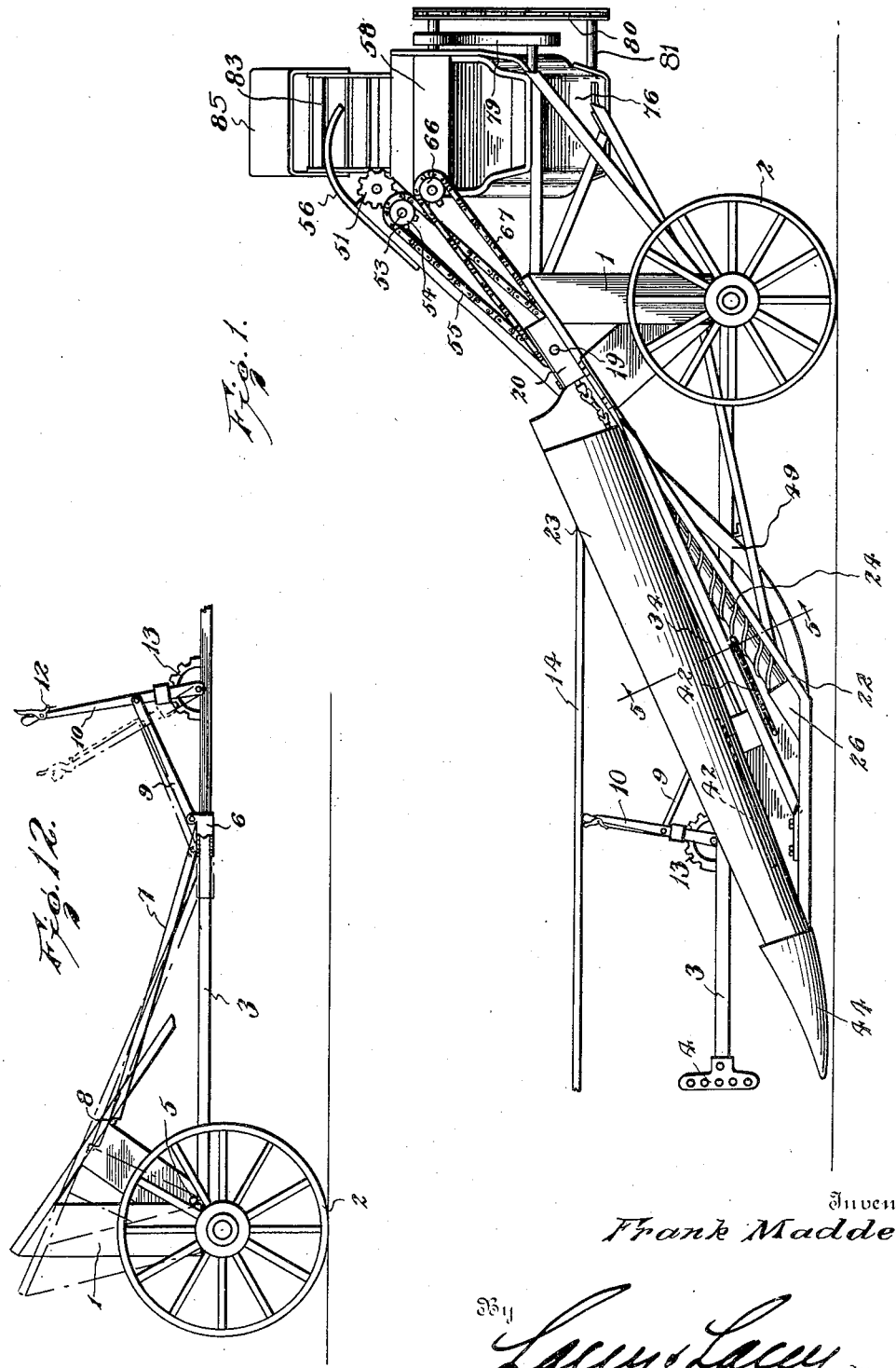
Inventor
Frank Madden
By Lacy & Lacy, Attorneys

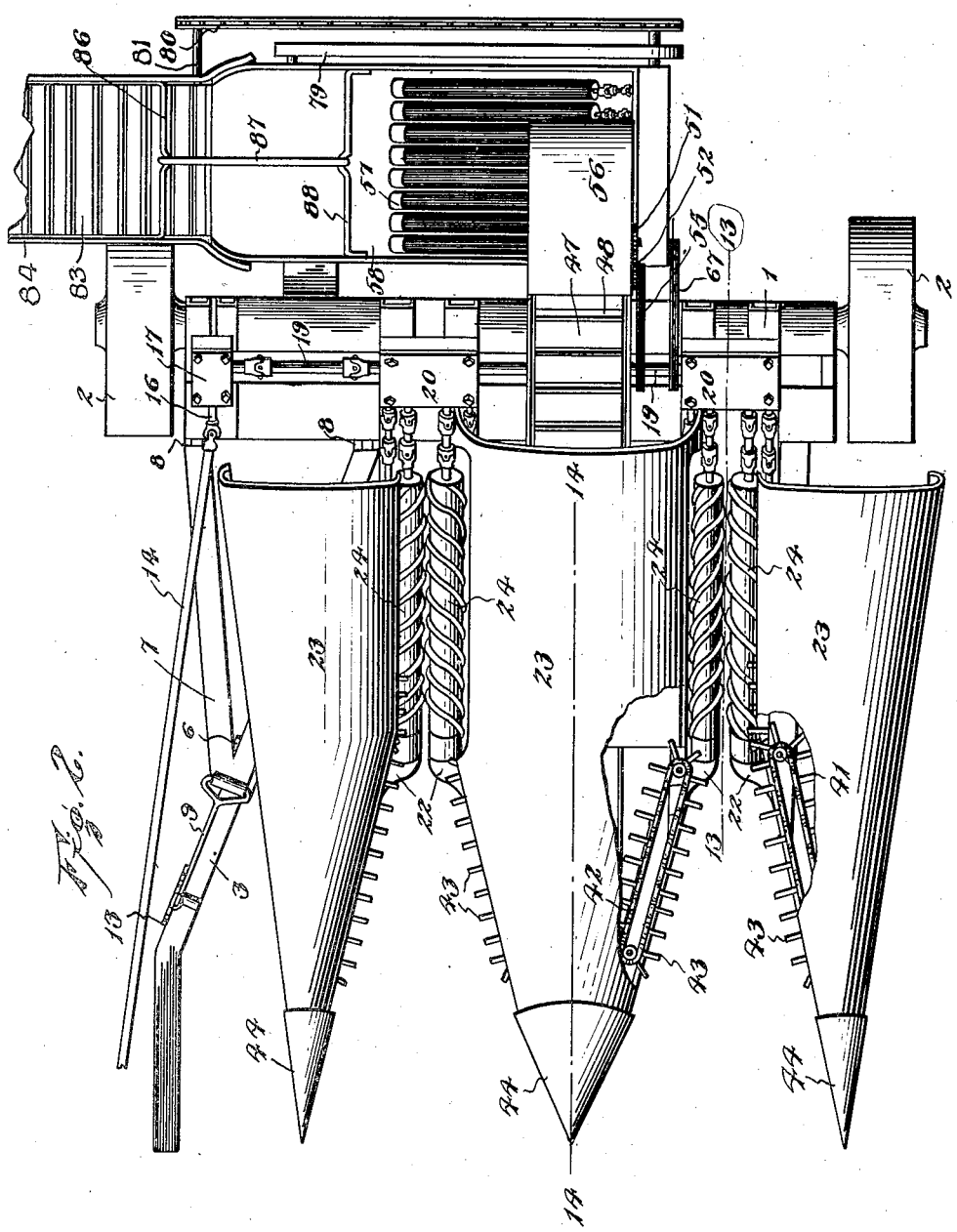

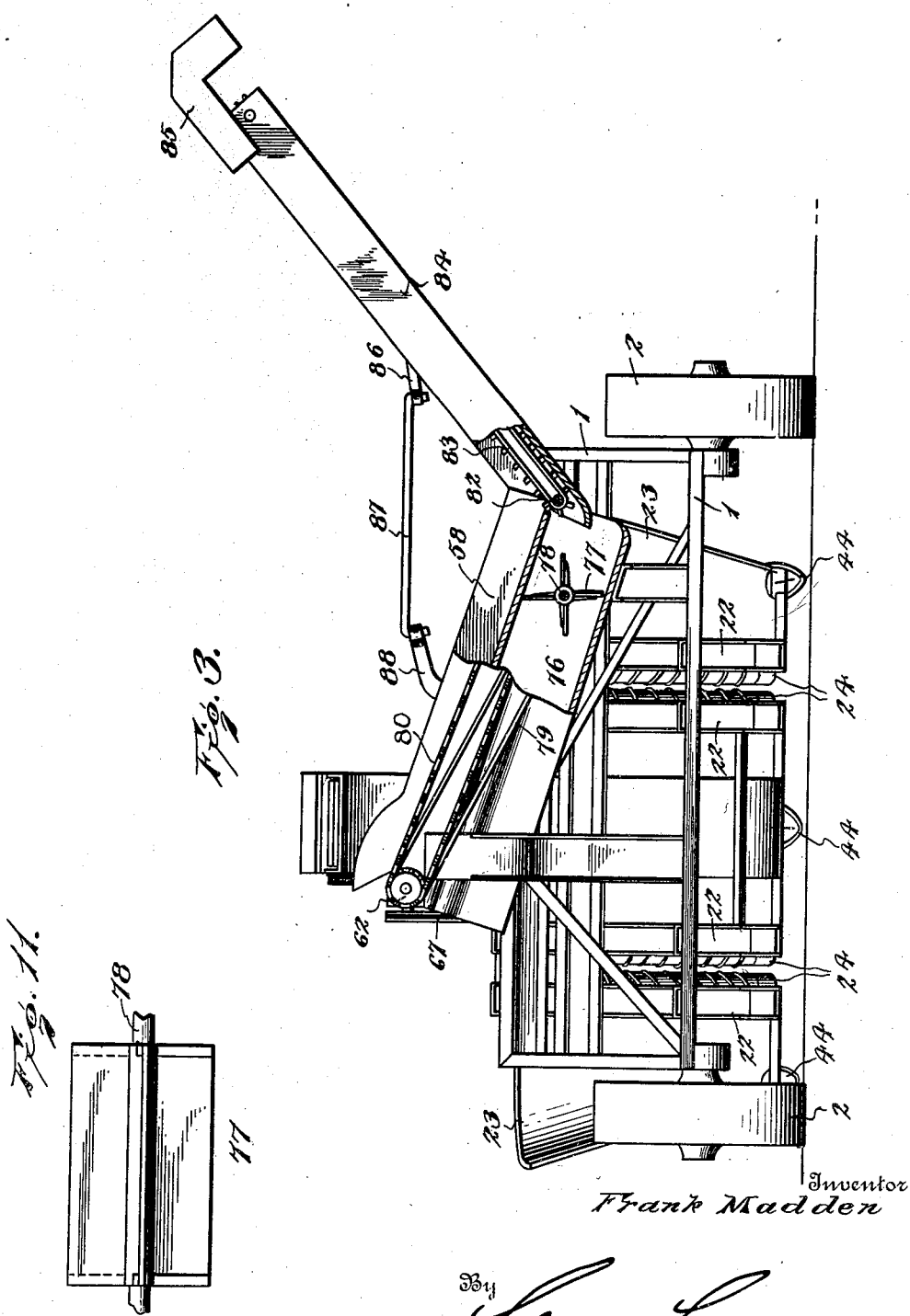

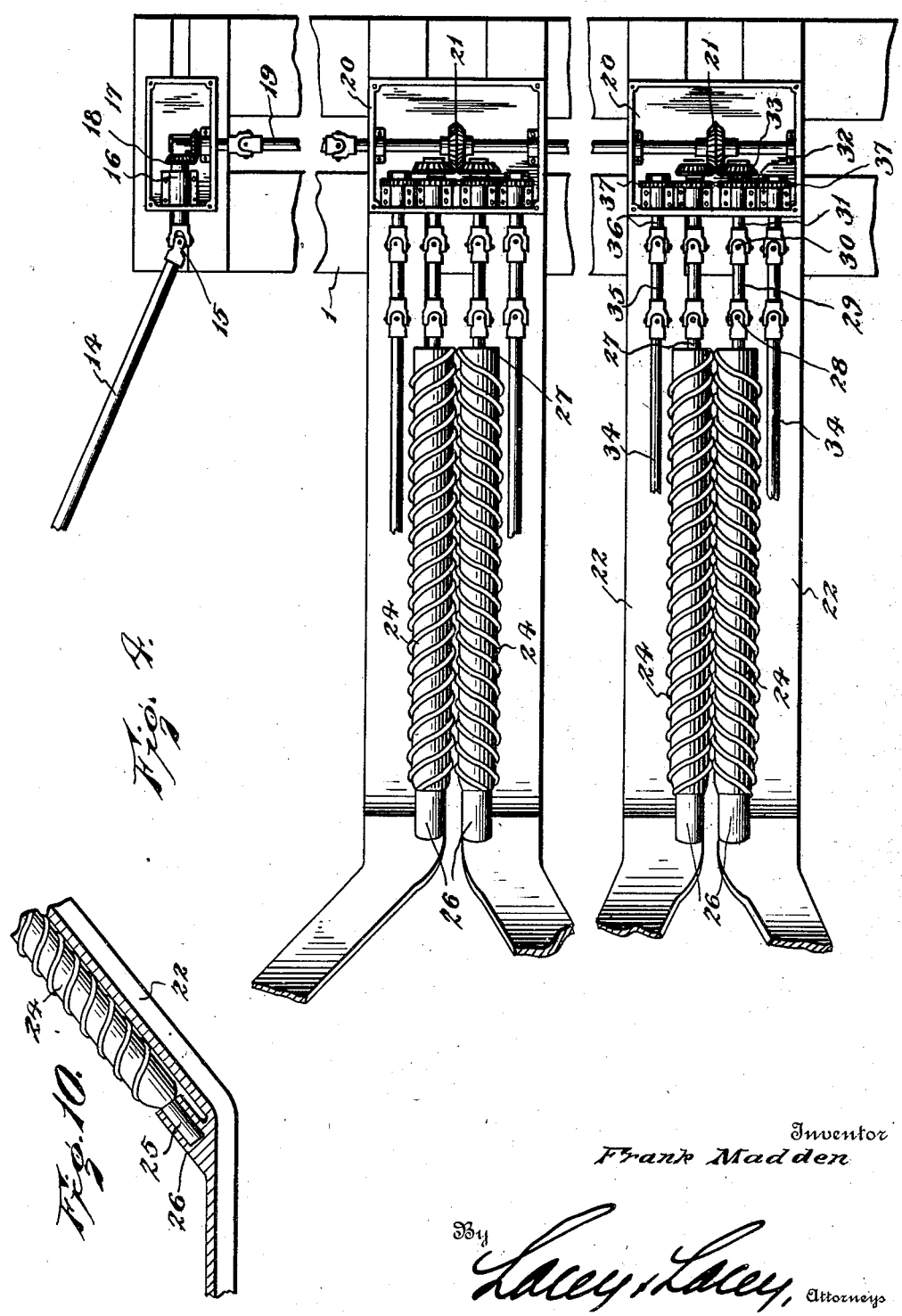

April 19, 1932.  F. MADDEN  1,854,554
CORN HARVESTER
Filed May 24, 1929   7 Sheets-Sheet 5
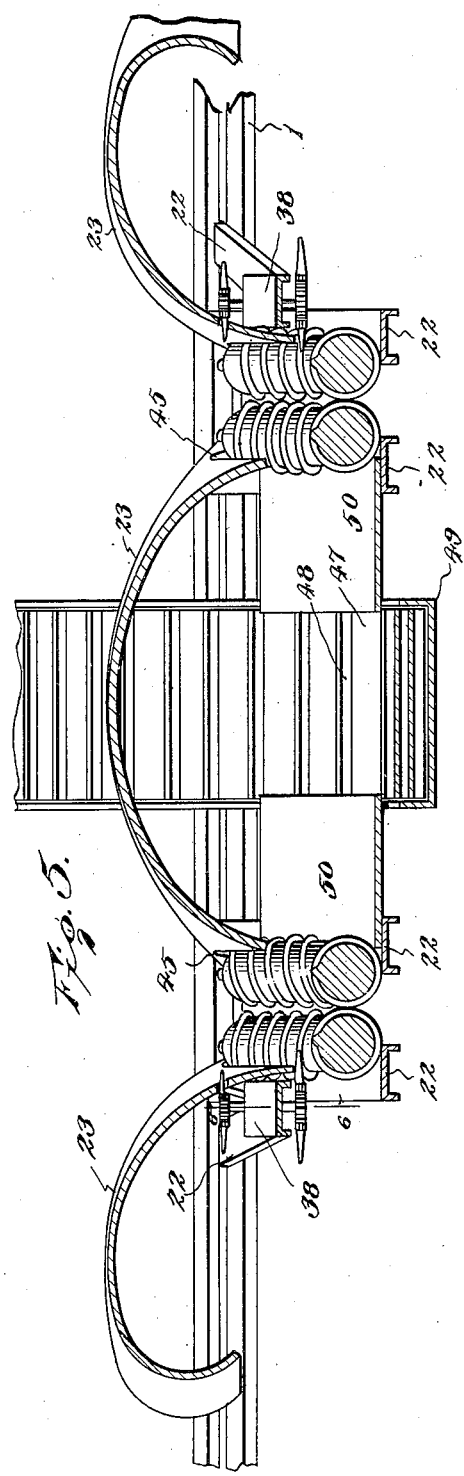
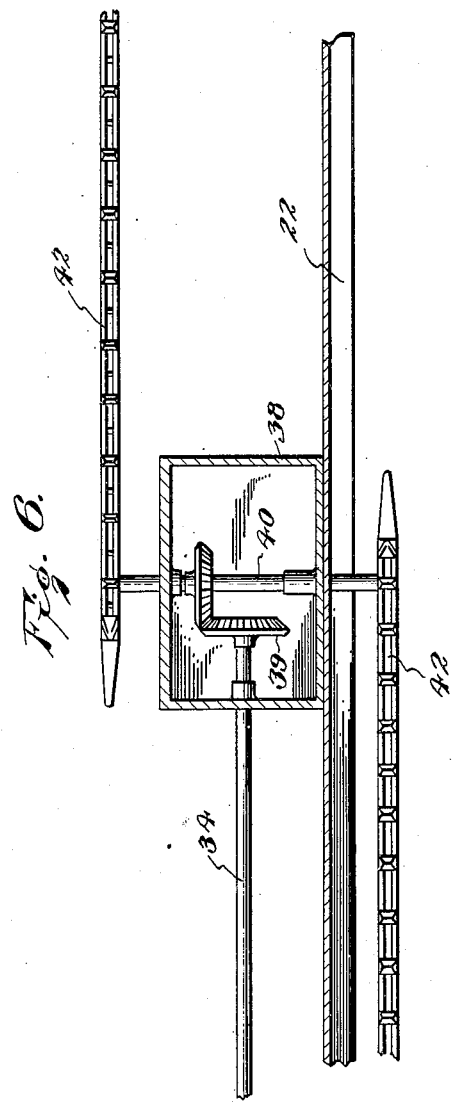
Inventor
Frank Madden
By Lacey & Lacey, Attorneys

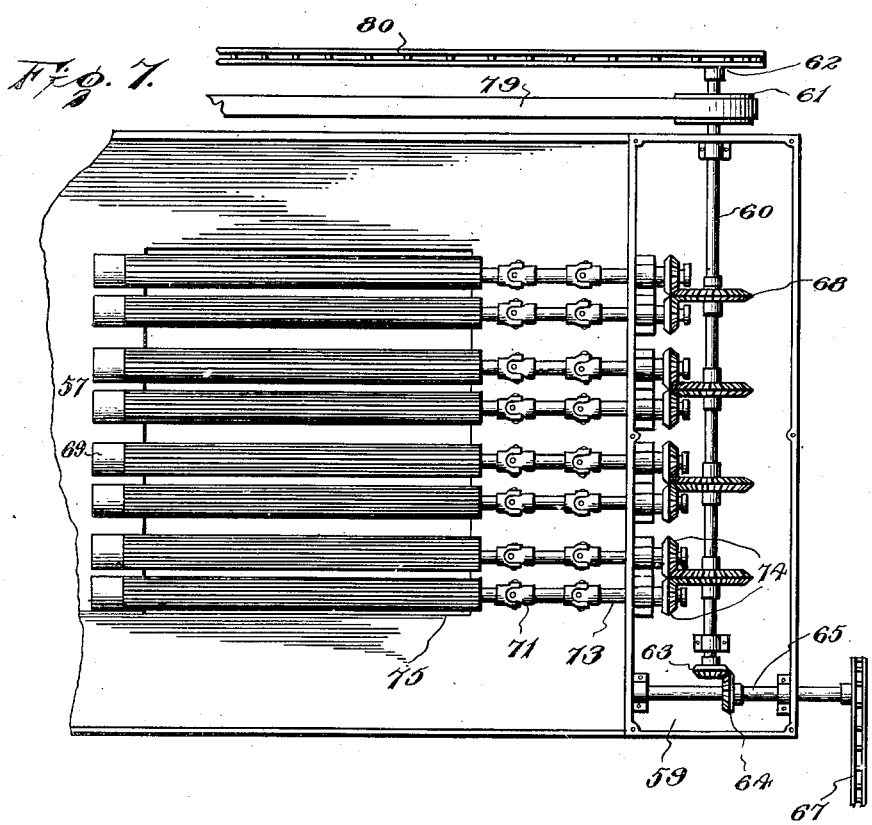
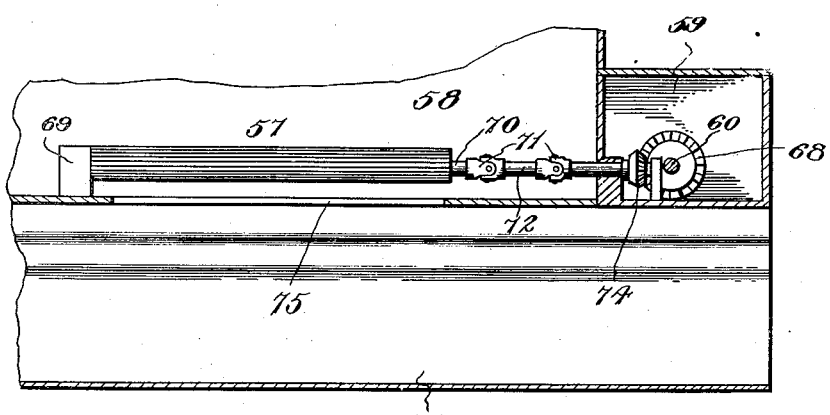

April 19, 1932. F. MADDEN 1,854,554
CORN HARVESTER
Filed May 24, 1929 7 Sheets-Sheet 7
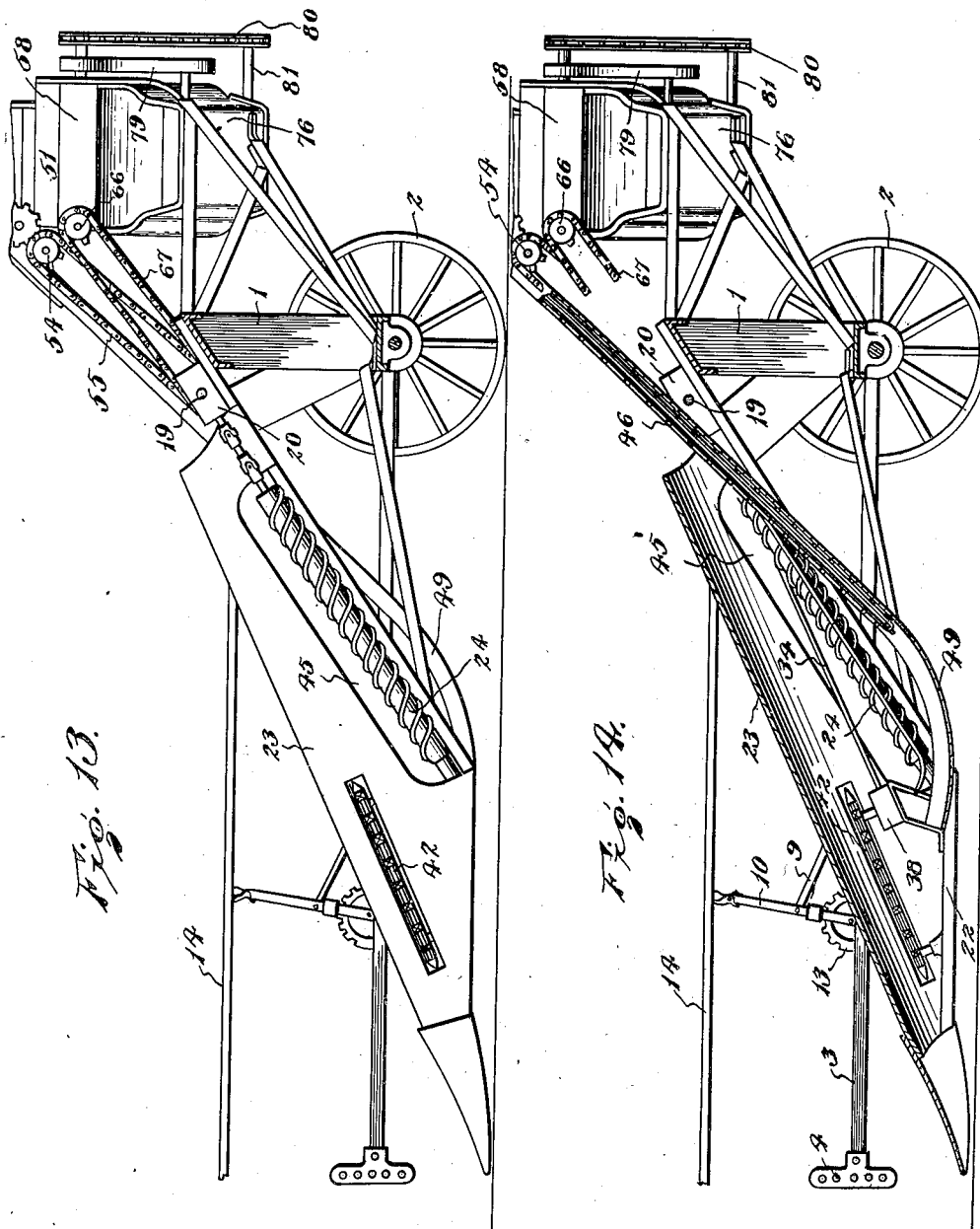
Inventor
Frank Madden
By Lacey & Lacey, Attorneys Patented Apr. 19, 1932

1,854,554

UNITED STATES PATENT OFFICE

FRANK MADDEN, OF EARLVILLE, ILLINOIS

CORN HARVESTER

Application filed May 24, 1929. Serial No. 365,663.

The object of this invention is to provide an apparatus which may be drawn over a field and act upon standing corn so as to strip from the stalks in adjacent rows the ears of corn and then remove the husks from the ears, the husks being discharged onto the ground and the ears of corn being delivered into a wagon or other receptacle drawn alongside the corn harvester. The invention seeks to provide a compact and easy-operating machine in which the driving gearing will be thoroughly housed so as to be protected from chance blows and the ears of corn as they are stripped from the stalks will be delivered to a central elevating conveyer and transferred to husking rolls at the rear of the machine. Other objects of the invention will appear incidentally in the course of the following description, and the invention resides in certain novel features which will be particularly pointed out in the appended claim.

In the annexed drawings:

Figure 1 is a side elevation of a corn harvester embodying my improvements,

Fig. 2 is a top plan view of the same with parts broken away,

Fig. 3 is a rear elevation with parts broken away and parts in section,

Fig. 4 is a plan view of the snapping rolls and the gearing for driving the same, Fig. 5 is a transverse section on the line 5—5 of Fig. 1 drawn on a larger scale, Fig. 6 is a detail sectional elevation on the line 6—6 of Fig. 5, Fig. 7 is a plan view of the husking rolls and the means for driving the same, Fig. 8 is a longitudinal section of the husking mechanism, Fig. 9 is a detail perspective view of a portion of a husking roll, Fig. 10 is a sectional elevation showing the mounting for the lower end of a snapping roll, Fig. 11 is a detail elevation of the fan, Fig. 12 is a side elevation showing the means for adjusting the draft bar to the height of a tractor, Fig. 13 is a vertical longitudinal section on the line 13—13 of Fig. 2, and Fig. 14 is a central longitudinal section substantially on the line 14—14 of Fig. 2.

In carrying out the present invention, there is provided a frame 1 which may be of any detail form which will provide the necessary strength and rigidity to support the working parts. This frame 1 is equipped at its ends with ground wheels 2 whereby the machine may travel readily over a field, and to one end of the frame is secured a draft bar or coupling frame 3 which extends forwardly and is equipped at its front end with a clevis 4 whereby it may be connected with a tractor to be drawn over the field. The draft bar or frame is hingedly connected with the main frame 1, as indicated at 5, and mounted upon the bar is a slide 6 to which is pivoted a link 7 which extends rearwardly and has its rear end hinged to a portion of the main frame, as indicated at 8, while a shorter link 9, pivoted to the slide extends forwardly and is pivoted to a hand lever 10 fulcrumed upon the draft bar and equipped with the usual latch 12 cooperating with a holding rack 13. By properly manipulating the lever in rocking the same forwardly or backwardly, the slide 6 will be caused to move longitudinally upon the draft frame 3 and this movement will tend to vary the angular relation of the links 7 and 9 to each other so that the parts will tend to swing upwardly or downwardly upon their hinged connections with the frame and thereby cause the front end of the draft bar to shift vertically and be readily adjusted to the height of the tractor. A power take-off shaft 14 is also disposed at the end of the frame and is adapted to be coupled to the power plant of the tractor at its front end while its rear end is connected by a universal joint 15 with a short shaft 16 extending through the front wall of a gear case 17, secured upon the frame, and equipped within said case with a beveled gear 18. The main shaft 19 extends across the machine, as shown most clearly in Fig. 4, and extends through gear casings 20 within which it is equipped with double beveled gears 21, as shown, said gear cases being secured upon the main frame 1 at or near the top of the same, as will be understood upon reference to Fig. 1. Secured to and extending downwardly and forwardly from the main frame are frame bars 22 having their front ends disposed in divergent relation and secured in any convenient manner to longitudinally extending hoods 23, the frame bars 22 being disposed in pairs and so located that, when the machine is in operation, they will run along adjacent rows of plants with the plants in each row being received between the members of a pair of said frame bars. Mounted upon each frame bar 22 is a snapping roll 24 which may be of any approved detail design, the rolls being arranged, of course, in pairs with each roll disposed above the frame bar upon which it is supported and each roll being equipped at its lower end with a stud or tenon 25 rotatably fitting in a socket 26 formed upon the adjacent frame bar to receive the tenon. The rear end of each snapping roll is formed with or secured to a trunnion or stub shaft 27 which is joined by a universal joint 28 to an intermediate shaft 29, said intermediate shaft being, in turn, coupled through a universal joint 30 with a stub shaft 31 extending into the adjacent gear case 20 and there equipped with a spur gear 32 and a beveled gear 33, the latter meshing with the adjacent double beveled gear 21, as shown clearly in Fig. 4. The cooperating snapping rolls will, consequently, be simultaneously rotated in opposite directions and at the same speed so that, as the machine moves along the rows of corn, the rolls will engage the ears of corn and will snap them from the stalks, it being noted and understood that the rolls are disposed in an oblique position so that they will meet the plants progressively and operate thereon from the ground up, and the length of the rolls should be such that they will reach the uppermost ears under normal conditions.

Disposed adjacent and at the outer side of each snapping roll is a longitudinal shaft 34 which is arranged parallel with the adjacent roll and is coupled to an intermediate shaft 35 which, in turn, is coupled to a short shaft 36 extending into the gear case 20 and there equipped with a spur gear 37 meshing with the spur gear 32 which is mounted upon the adjacent shaft 31. It will thus be seen that the shafts 34 are rotated in unison with the snapping rolls. The front end of the shaft 34 enters a gear case 38 secured upon the frame bar 22 and a beveled gear 39 is secured upon the front end of the shaft within said gear case. A transmission shaft 40 is journaled in and extends through the top and bottom of the gear case 38 and upon its ends are sprocket pinions 41 which mesh with and actuate chains 42 equipped with lateral fingers 43 which engage the corn and direct it into and retain it in the space between the cooperating snapping rolls. It will be observed that there are two gathering chains provided to cooperate with each outer snapping roll and these chains work through slots provided therefor in the inner sides of the outer hoods 23, the lower chain being disposed at the rear of the upper chain. Upon the middle hood only the upper chains are provided, one of said chains, however, being located on each side of the hood. Upon referring to Fig. 2 more particularly, it will be noted that the hoods taper forwardly and their adjacent sides, therefore, diverge in advance of the snapping rolls. The gathering chains, of course, follow the inclination or oblique disposition of the walls of the hoods and, consequently, they will engage the corn stalks even when the latter are considerably out of alinement and will direct them into the space between the snapping rolls. It will also be noted that the hoods incline downwardly and forwardly so that the gathering chains tend to lift any stalks which may be bent over and each hood, at its front end carries a tapered or conical cap 44 which runs close to the ground and is adapted to pass under and lift any stalks which may be bent over to the ground. The middle hood 23 is provided in its sides with longitudinally extending openings 45 accommodating the adjacent snapping roll, the upper wall of said opening being spaced vertically from the roll, as shown most clearly in Figs. 13 and 14, and the ears of corn as they are snapped from the stalks by the snapping rolls will be directed through the adjacent opening 45 onto a conveyer 46 which carries them rearwardly and delivers them to the husking mechanism. The conveyer consists of an endless belt or apron 47 having transverse slats 48 secured thereon and traveling in a trough 49 secured to the main frame and extending downwardly and forwardly therefrom along the central longitudinal line of the middle hood and under the hood, the front extremity of the trough being curved so as to terminate in a horizontal plane of the frame bar 22, as shown most clearly in Fig. 14, whereby loss of corn will be prevented. Along the sides of the trough, plates 50 extend longitudinally between the trough and the adjacent frame bar 22 so that the ears of corn will be directed into the trough or onto the conveyer and will be prevented from dropping to the ground. The conveyer is mounted upon transverse drums or rollers in a well known manner, one of the drums being located at the upper end of the trough 49 and being equipped at one end with a spur gear 51 meshing with a similar gear 52 carried by a stub shaft 53 on which is also secured a sprocket 54. A sprocket chain 55 is trained around the sprocket 54 and also around a sprocket secured on the main shaft 19 so that the conveyer will be driven in the proper direction from the main shaft. A cap plate 56 is secured to the upper end of the trough 49 and projects rearwardly therefrom so that the ears of corn brought up by the conveyer will be directed onto the husking rolls.

The husking rolls are indicated at 57 and are disposed within a chute 58 which is supported upon the main frame at the rear of the gathering mechanism and transversely thereto. The chute 58 is inclined downwardly, as shown in Fig. 3, and a gear case 59 extends entirely across its upper end. Within this gear case is a main shaft 60 which has its rear end projecting through the rear side or end of the case and equipped with a pulley 61 and a sprocket 62, as will be understood upon reference to Fig. 7. At the front end of the shaft 60, a beveled pinion 63 is secured thereto and meshes with a similar pinion 64 secured upon an intermediate shaft 65 which is mounted in the gear case at a right angle to the shaft 60 and projects from the upper side of the case and is there equipped with a sprocket 66 about which is trained a chain 67, said chain being also trained about a sprocket secured upon the main shaft 19, as will be understood upon reference to Fig. 2. It will thus be seen that the shaft 60 is driven from the main shaft 19, and upon reference to Fig. 7, it will be noted that upon the shaft 60 are secured a series of double beveled gear wheels 68. The lower ends of the husking rolls 57 are mounted in bearings 69 provided therefor upon the floor of the chute 58 and their upper ends are formed on or equipped with trunnions or stub shafts 70 connected through universal joints 71 and intermediate shafts 72 with shafts 73 extending through the side wall of the gear case 59 and equipped with beveled pinions 74 meshing with the corresponding double beveled gears 68, as will be understood upon reference to Fig. 7, so that the husking rolls will be properly operated to grip the husks of the ears of corn passing thereover and strip the husks from the ears. It will be understood, of course, that the bearings in the gear cases 20 and 59, in actual practice, extend from the wall of the case to the gears 32, 37 or 74 and prevent endwise movement of the respective shafts which would tend to pull the gears thereon out of mesh with the driving gears. An opening 75 is formed in the bottom of the chute 58 immediately under the husking rolls so that the husks may drop therethrough into a lower chute 76 arranged immediately under the chute 58 and extending downwardly and laterally therewith. In the lower end of the chute 76 is mounted a transverse rotatable fan 77 of any approved form having its axle 78 extended through the rear side of the chute and equipped with a pulley about which and the pulley 61 is trained a belt 79 whereby the fan will be rotated from the shaft 60. The rotation of the fan creates a strong blast through the chute 76 so that the husks will be drawn therethrough and blown to one side to be deposited on the ground. A sprocket chain 80 is trained about the sprocket 62 on the shaft 60 and also about a sprocket on a shaft 81 which carries the lower drum 82 supporting an endless belt conveyer 83 mounted within a frame 84 extending upwardly and laterally from the lower end of the chute 58, as shown in Fig. 3. This frame 84 is provided at its upper end with a deflecting hood 85 whereby the husked ears of corn brought to said point by the elevating conveyer 83 will be directed into a wagon driven alongside the harvester. It will be noted that the lower bight of the elevating conveyer 83 is located immediately adjacent the lower end of the chute 58 so that the ears of corn sliding down the floor of the chute will be directed onto the conveyer. The frame 84 is equipped with a bail 86 and a link 87 connects said bail with a similar bail 88 secured upon the chute 58 so that the elevator frame will be properly supported.

From the foregoing description, taken in connection with the accompanying drawings, it will be seen that I have provided a compact machine which may be readily drawn over a field and will operate efficiently to harvest corn and remove the husks therefrom. The hoods which lead rearwardly from the gathering points are of convex formation and expand toward their rear ends so that they will effectually protect the working parts from clogging or damage through chance blows and will also turn aside any dirt or other foreign matter which might tend to lodge on the hoods.

Having thus described the invention, I claim:

A corn harvester comprising a portable frame including downwardly and forwardly inclined portions and horizontal portions extending forwardly from the lower ends of the respective inclined portions, snapping rolls arranged in pairs with their upper ends mounted on inclined portions of the frame and their lower ends journaled on the horizontal forwardly projecting portions of the frame, a central hood disposed between the pairs of snapping rolls with its side edges corresponding in contour to the inclined and horizontally projecting portions of the frame and secured thereto, the side portions of the hood having openings therein to accommodate the adjacent snapping rolls and permit ears of corn to pass therethrough, side hoods each disposed adjacent and at the outer side of a pair of snapping rolls with its inner edge secured to the inclined and horizontal portions of the frame and provided with an opening to accommodate the adjacent snapping roll but prevent passage of ears of corn therethrough, a conveyer disposed longitudinally under the central hood and including a trough having an extended front terminal portion to retain shelled corn, plates extending from the inner snapping roll of each pair of rolls to the conveyer to direct ears of corn to the conveyer, gathering chains disposed adjacent the forward ends of the snapping rolls, shafts disposed parallel with the snapping rolls and geared at their rear ends to said rolls and at their front ends to the gathering chains, a single transverse shaft on the upper rear portion of the frame, and gearing connecting said shaft with the upper ends of the snapping rolls.

In testimony whereof I affix my signature.

FRANK MADDEN. [L. S.]